INVENTOR.

BY ANDREW LENARD
RUSSELL KULSRUD
JOHN L. JOHNSON
IRA B. BERNSTEIN

Roland A. Anderson

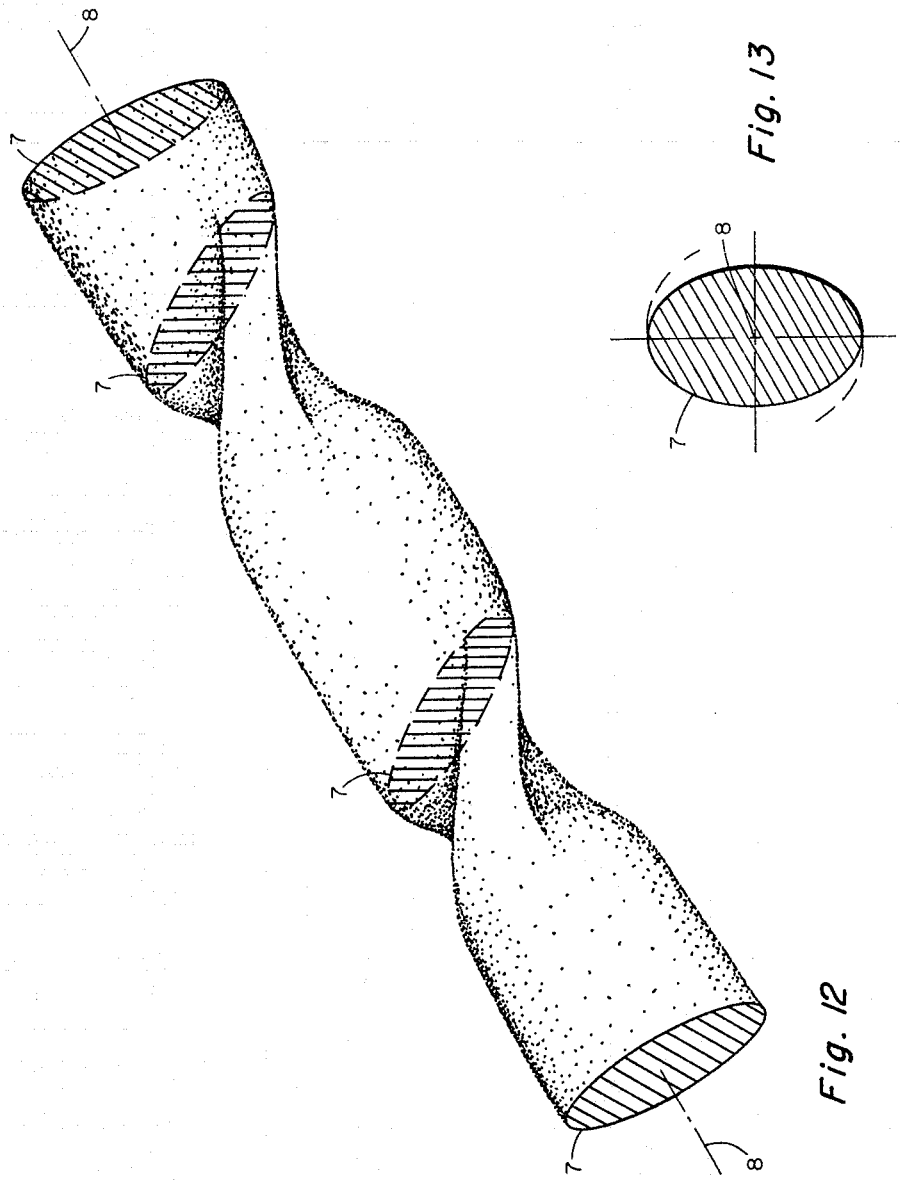

United States Patent Office 3,278,384
Patented Oct. 11, 1966

3,278,384
NEGATIVE "V" STELLARATOR
Andrew Lenard, Trenton, and Russell M. Kulsrud, John L. Johnson, and Ira B. Bernstein, Princeton, N.J., assignors to the United States of America as represented by the United States Atomic Energy Commission
Filed Apr. 13, 1965, Ser. No. 447,934
13 Claims. (Cl. 176—1)

This invention is an improvement of previous methods and apparatus for confining a plasma column of ions and electrons away from the inside walls of a toroidal container in that it provides hydromagnetically stable confinement. This invention was made in the course of, or under a contract with the United States Atomic Energy Commission.

In thermonuclear fusion research it has been desirable to confine a plasma column away from the inside walls toroidal container by a magnetic field. Various proposals have been made and used to this end, comprising the arrangements shown and described in U.S. Patents 2,910,414, 3,002,912, 3,012,955, 3,015,618 and 3,088,894 and used in the Model C stellarator at Princeton, New Jersey. While these arrangements have been useful and have been successful in providing a confined plasma column, the magnetic configurations provided thereby have been hydromagnetically unstable even for low pressures due to the finite resistivity of the plasma.

The method and apparatus of the present invention provide a modified C stellarator that properly shapes the magnetic surfaces so as to obtain sufficient hydromagnetic stability even in the presence of nonzero resistivity. The methods and constructions involved in this invention utilize standard and well-known techniques and apparatus and are highly flexible for a wide range of applications, plasma densities, plasma constituents, and plasma temperatures (consistent with sufficiently low electrical resistivity that the previously employed stellarator techniques described in the above-mentioned patents are applied). More particularly, this invention contemplates the use of a combination of conventional and multipolar current carrying windings to produce a vacuum magnetic field which has the property that $d^2V/d\psi^2<0$ inside a bounded region with V the volume inside a magnetic surface which is labeled by the contained longitudinal magnetic flux $\psi$. More specifically, the invention involves a combination of conventional and crossed multipolar windings for providing a magnetic field tangent to a set of nested toroidal surfaces closing on a closed central line, the field also possessing a rotational transform, and superimposing thereon multipolar field that produce a corrugation field that provides a ripple on the magnetic surfaces. In one embodiment these windings comprise a combination of four distinctly different sets of conductors, comprising conventional solenoidal windings to provide a magnetic field in the direction of the axis of the plasma column, a first set of conventional four multipolar windings with current in opposite directions in adjacent windings twisted along the column with periodicity over a long length, and two, crossed, second sets of highly twisted short period multipolar windings, one with two conductors with opposing currents twisting nearly three times faster than the other which has six wires with current directed oppositely in adjacent windings. With the proper selection of windings, or coils, as described in more detail hereinafter the windings produce superpositions of multipolar fields which resonate in such a way that the magnetic field lines are concave outward from the equilibrium axis in an average sense, i.e., the volume per unit magnetic flux enclosed between neighboring toroidal surfaces decreases outwardly.

It is the object of this invention, therefore, to provide a method and apparatus such that a low pressure plasma can be confined in a hydromagnetically stable configuration.

It is the object of this invention to achieve such hydromagnetic stability without reliance on magnetic field shear by distorting the shape of the magnetic surfaces to make $V''(\psi)<0$;

A further object of this invention is the provision for hydromagnetic stability based on $V''(\psi)<0$ in systems such that the field lines have shear, i.e., $d\iota(\psi)/d\psi \neq 0$ with $\iota$ the rotational transform. As defined earlier, $V''$ is the second derivatives V, the volume of a magnetic surface, with respect to $\psi$, the magnetic flux through a cross section of the surface. The rotational transform, $$\iota = 2\pi d\chi/d\psi$$

with $\chi$ the magnetic flux through a ribbon one side of which lies on the surface labeled and $\psi$ and the other side of which is the magnetic axis, is the average pitch of the magnetic field.

The above and novel features and objects of this invention will appear more fully from the following discussion and detailed description when these are read in connection with the accompanying diagrams. It is to be expressly understood, however, that the drawings are not intended as a definition of the invention but are for the purpose of illustration only. Indeed the specific conductor configurations we describe represent specific ways that the desired magnetic fields are generated and with the proper selection of coil configurations by standard techniques the desired fields are provided with low power requirements.

In the drawings, where like parts are marked alike:

FIG. 9 is a partial three-dimensional view of a section of a stellarator configuration in a second embodiment of this invention;

FIG. 12 is a partial three dimensional view of the plasma configuration produced by the coil configuration of FIG. 2;

FIG. 13 is a partial cross-section of FIG. 12 with dashed lines illustrating schematically the rotation thereof along the axis of the plasma column to produce the plasma configuration of FIG. 12.

Figure 1:
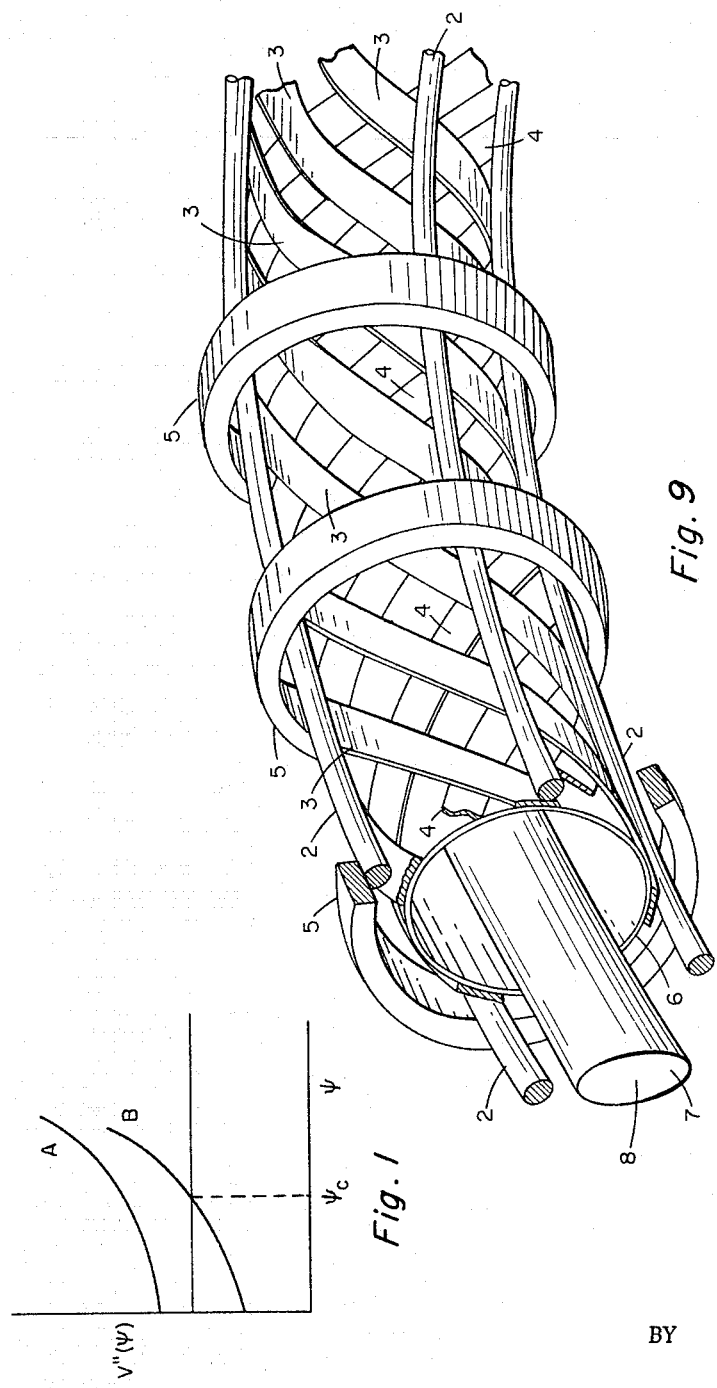
FIG. 1 is a qualitative graph of $V'(\psi)$ as a function of $\psi$ for a negative $V''$ stellarator configuration and a normal configuration.

A mathematical treatment of principles involved in this invention is given by A. Lenard, Phys. Fluids 7, 1875 (1964) and J. L. Johnson, Phys. Fluids 7, 2015 (1964). The apparatus of this invention is incorporated into the existing stellarators so that use is made of the well-known techniques for forming axial, helical and solenoidal electrical windings for producing the desired magnetic fields, discussed in the above-mentioned U.S. Patents as well as in "Controlled Thermonuclear Reactions," by Samuel Glasstone and Ralph H. Lovberg, published by D. Van Nostrand Company, Inc., in 1960, and "Project Sherwood—The U.S. Program in Controlled Fusion," by Amasa S. Bishop, published by Addison-Wesley Publishing Co., Inc. in 1958. Standard well-known techniques such as ion-cyclotron heating, magnetic pumping, or injection of a beam of excited neutral particles or molecular ions, are used to provide a hot plasma. The effect of curvature of the toroidal system is ignored where appropriate for simplicity. Such effects do not significantly alter the essential features of the invention. The use of the conductor configuration proposed by Koenig, U.S. Patent No. 3,088,894 and shown in FIG. 1 thereof, but with the currents flowing in the opposite direction in his longitudinal conductors from that specified therein, distort the magnetic surfaces in such a manner that the curvature enhances the stabilization beyond that described in the following discussion.

The basic physical reasoning which led to this invention grew out of the discovery that if the plasma is confined inside a region such that the magnitude of the magnetic field B increases outward in all directions, hereinafter referred to as the minimum B concept, the system is stable with respect to interchange instabilities. This stability property is useful only for systems which rely on mirror confinement. The minimum B concept can be extended to closed configurations in which the magnetic field lines close on themselves where, for sufficiently low confined material pressure, hydromagnetic stability is achieved because $$\oint dl/B$$

taken over a magnetic field line, decreases outward from the center of the plasma. This integral condition is essentially the minimum B condition averaged over a field line.

The present invention removes four basic limitations associated with these configurations: (1) In the closed-field-line devices which have been proposed the surfaces of constant material pressure must be highly distorted so that the necessary apparatus, and especially the vacuum enclosure, is difficult to fabricate; (2) In closed-field-line devices minor errors in field design or coil misalignment seriously change the equilibrium properties of the device and destroy the stability feature; (3) There is no possibility of introducing magnetic field shear into closed-line devices; (4) the velocity space end loss creates a basic limitation on the systems relying on mirror confinement.

If a rotational transform is present such that the lines of force do not close on themselves the concept of $$\oint dl/B$$

loses its meaning. The concepts of rotational transform and magnetic surfaces as well as the relation of these equilibrium functions to multipolar current windings are described in detail, for example, in the cited Glasstone and Loveberg publication on page 297 et seq. In stellarator configurations which have such a transform the function, $$V'(\psi) \equiv dV(\psi)/d\Psi = \lim_{n \to \infty} \frac{1}{n} \oint dl/B \quad (1)$$

where the integral is extended over some line of force for $n$ trips the long way around the torus, the limit being independent of the initial point chosen, provides a reasonable generalization of $$\oint dl/B$$

Here $V(\psi)$ is the volume of that magnetic surface which encloses longitudinal magnetic flux $\psi$. The condition that low pressure configurations with finite electrical resistivity in which the field lines form magnetic surfaces be sufficiently stable with respect to hydromagnetic interchange instabilities is then $$V''(\psi) \equiv d^2V(\psi)/d\psi^2 < 0 \quad (2)$$

in the region where $dp(\psi)/d\psi < 0$. Here $p$ is the material pressure. If this criterion is satisfied there is still an unstable resistive interchange mode whose growth rate is slow enough that it is tolerable. In the conventional stellarator configuration, shown in FIG. 1 of the cited Stix Patent 3,015,618, the vacuum magnetic field produces magnetic surfaces with $V''(\psi)$ having the qualitative form shown by curve A of FIG. 1. Since the material pressure must vanish at the interior wall of the vacuum vessel, it is clear that stable confinement in such a configuration is impossible. Curve B of FIG. 1 is typical of devices which incorporate this invention. If the material pressure is distributed so that $dp/d\psi = 0$ for values of $\psi$ greater than $\psi_c$, then hydromagnetic interchange instabilities do not occur even when the effect of finite electrical resistivity is considered. It is recognized that for too large plasma pressure ballooning instabilities, which bend the magnetic field lines are still possible just as in closed line configurations in which $$\oint dl/B$$

has a local maximum. In accordance with this invention, however, this mode presents no problem for reasonable values of confined material pressure.

As a specific embodiment of this invention, the vacuum magnetic field is given by $$\underline{B} = B^{(o)} \underline{\nabla} \left\{ z + \frac{2\delta}{\gamma} I_2(2\gamma r) \sin 2(\theta - \gamma z) \right.$$
$$\left. + \sum_{l=1,3} \frac{\epsilon l}{h+l\gamma} I_l[(h+l\gamma)r] \sin [l(\theta - \gamma z) - hz] \right\} \gamma/h \sim \epsilon_1^2 \sim \epsilon^2,$$
$$hr \sim \delta \sim 1 \quad (3)$$

Here $\epsilon$ is an expansion parameter which may be as large as one in the results. Since curvature has been neglected in this discussion, $r$, $\theta$, and $z$ are the usual cylindrical coordinates; $B^{(o)}$ is the magnitude of a uniform solenoidal magnetic field; the parameter $\delta$ is a measure of the amount of current flowing through a four-wire coil configuration to produce a helically invariant field with an $l=2$ multiplicity and a slow pitch $\gamma$; the parameters $\epsilon_1$ and $\epsilon_3$ measure the currents in two other coil configurations which respectively produce helically invariant fields with an $l=1$ multiplicity and a pitch $\gamma+h$, and an $l=3$ multiplicity and a pitch $\gamma+h/3$; $I_l(x)$ is the usual Bessel function of imaginary argument.

Figure 2:
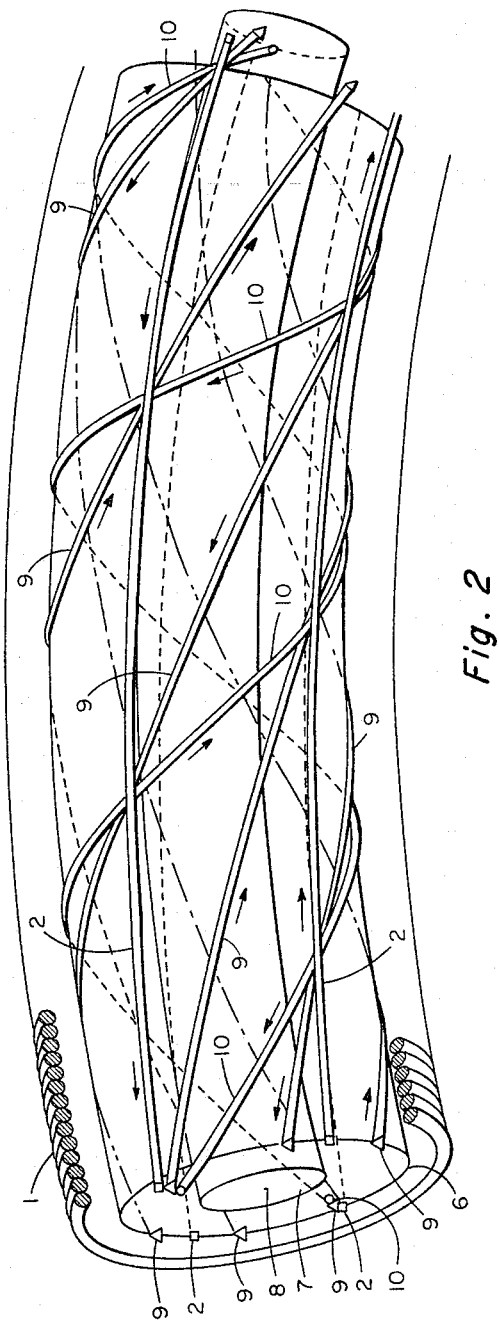
FIG. 2 is a partial three-dimensional view of a section of a stellarator configuration in a specific embodiment of this invention.
Figure 3:
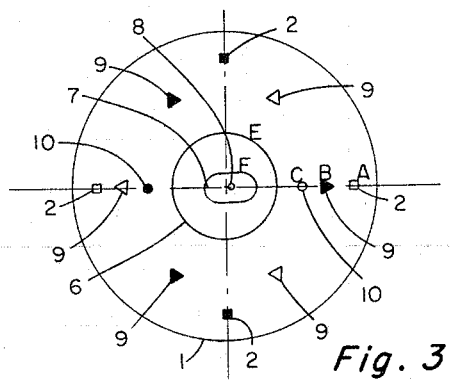
FIG. 3 is a cross section along the stellarator axis of FIG. 2.
Figure 4:
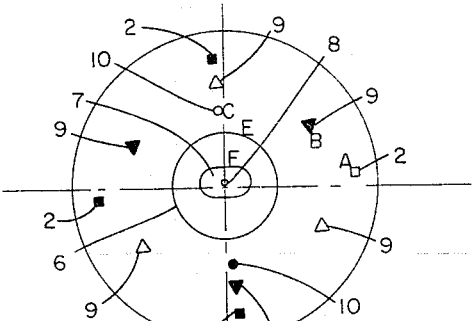
FIG. 4 is a cross section along the stellarator axis of FIG. 2, a distance $\gamma z=5°$ from the cross section in FIG. 3.
Figure 5:
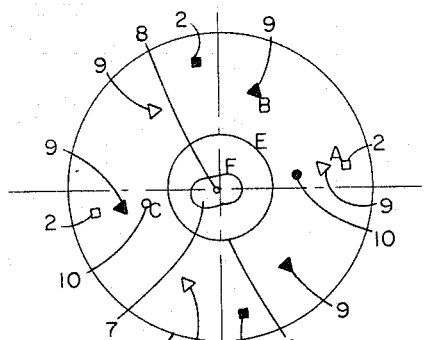
FIG. 5 is a cross section among the stellarator axis of FIG. 2, a distance $\gamma z=10°$ from the cross section in FIG. 3.
Figure 6:
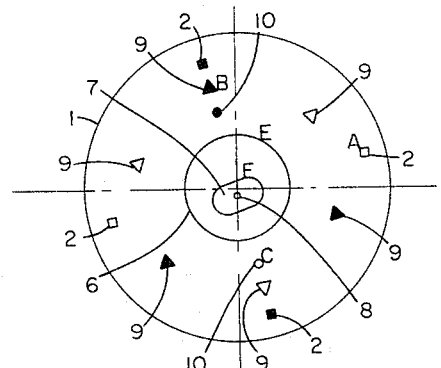
FIG. 6 is a cross section along the stellarator axis of FIG. 2, a distance $\gamma z=15°$ from the cross section in FIG. 3.
Figure 7:
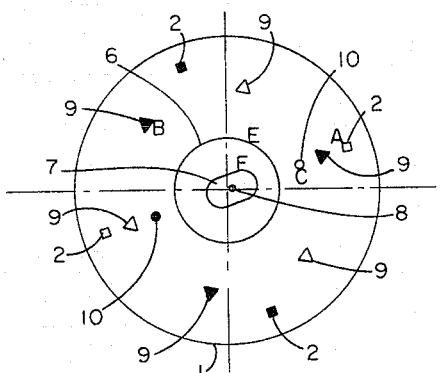
FIG. 7 is a cross section along the stellarator axis of FIG. 2, a distance $\gamma z=20°$ from the cross section in FIG. 3.

FIGURE 2 is a partial three-dimensional view of the coil configuration of this embodiment which produces the field given by Eq. 3. In this embodiment the windings comprise a combination of solenoidal windings to provide a magnetic field in the direction of the axis of the plasma column, a set of four multipolar windings with current in opposite directions in adjacent windings twisted along the column with periodicity over a long length, and a set of highly twisted short period, crossed multipolar windings, one with two conductives with opposing currents twisting three times faster than the other which has six wires with current directed oppositely in adjacent windings.

FIGURES 3 through 7 (labeled $\gamma z=0°$, $\gamma z=5°$, $\gamma z=10°$, $\gamma z=15°$, and $\gamma z=20°$, respectively) show constant $-z$ cross sections of this principal embodiment. The configuration at $\gamma z=20°$ is identical to that at $\gamma z=0°$ except for a rigid rotation of 20°. Thus at $\gamma z=25°$ the configuration is identical to that at $\gamma=5°$, again with a 20° rotation. In these figures the coils marked A, B, and C denote the same three wires in each cross section.

The current is illustrated as being into the paper by the solid conductors and out of the paper by the open conductors for ease of explanation.

The solenoidal windings which provide the uniform axial field associated with the first term in Eq. 3 is labeled 1 and the shaping field is provided by a four wire multipolar winding 2 which has a small pitch. The $l=3$ and $l=1$ terms in the corrugator field are produced respectively a six-wire multipolar field means 9 and a two-wire multipolar field means 10 as shown. The vacuum enclosure is denoted by 6, the surface of the plasma by 7 and the magnetic axis, that magnetic field line which closes on itself, by 8. Although the plasma cross section 7 is not circular and its center 8 is offset toward the conductor marked C, it should be emphasized that the plasma column is compact and has a relatively uniform cross section FIG. 12 is a partial three-dimensional view of the equally spaced plasma column cross-sections 7 of FIGS. 3 through 7 along the twisting magnetic axis 8 thereof. FIG. 13 is a partial cross-section of the elliptical cross-section of FIG. 12 with dashed lines to indicate the rotation thereof to produce the configuration of FIG. 12. The plasma configuration of FIGS. 3–7 as well as the plasma configurations of FIGS. 12 and 13 are all produced by the windings of FIG. 2.

The magnetic field described by Eq. 3 has magnetic surfaces which for $hr$ smaller than one have on the average elliptical cross sections. (These ellipses are perturbed by the corrugation field, being slightly distorted with their center shifted periodically by the corrugator field. Near the magnetic axis where the surfaces are small the shift is comparable to the diameter of the ellipses. These small distortions do not effect $V''$ significantly.) The lowest-order magnetic surface (in $\epsilon$) is given by $\psi^0=$ const, where $\psi^0$ is given for $hr$ smaller than one by $$\psi^\circ = \frac{\pi r^2 B^{(\circ)}}{(1-4\Delta^2)^{1/2}}[1-2\Delta \cos 2(\theta-\gamma z)] \quad (4)$$

with $$\Delta = \frac{\delta + h\epsilon_1\epsilon_3/32\gamma}{1-h\epsilon_1^2/8\gamma} \quad (5)$$

Thus $q$, the ratio of major to minor axes of the ellipse, is $[(1+2\Delta)/(1-2\Delta)]^{1/2}$.

The rotational transform on the axis is $$\iota(0) = \gamma L - \gamma L\left(1-\frac{h\epsilon_1^2}{8\gamma}\right)(1-4\Delta^2)^{1/2} \quad (6)$$

(Note the rotation of the surface is $\gamma L$ and the lines rotate slower due to the second term.) The shear on the axis is $$\frac{d\iota}{d\psi} = \frac{h^3 L[(5\epsilon_1^2+\epsilon_3^2)(1+2\Delta^2)+21\epsilon_1\epsilon_3\Delta]}{128\pi B^{(\circ)}(1-4\Delta^2)} \quad (7)$$

Equation 7 illustrates another desirable feature of the invention. Although magnetic field shear is not essential for hydromagnetic stability in these configurations, it is necessary to have shear to stabilize the well-known universal instabilities. The embodiments of this invention which are described herein are capable of providing such magnetic field shear.

On the axis $$V''(0) = \frac{h^2 L}{8\pi(1-4\Delta^2)^{1/2}}\left[2\epsilon_1^2+\Delta\epsilon_1\epsilon_3+\frac{32\gamma^2\delta\Delta}{h^2}\right] \quad (8)$$

(The last term in the bracket is actually of higher order in the $\epsilon$ expansion but is retained because it represents the contribution of the shaping field to $V''(0)$.) We note that $\epsilon_3^2$ does not enter this expression so that if $\Delta$ is not zero ($q>1$), $\epsilon_3/\epsilon_1$ can be made sufficiently large and negative that $V''(0)$ is negative.

One simplification of this embodiment is to eliminate the $l=2$ shaping field ($\delta=0$). In this case the corrugator fields determine $\Delta$. A specific coil configuration which produces this field is illustrated in FIGS. 2 through 7 but without the coils denoted by 2.

A second embodiment of the invention is to replace the rotating helical fields of the corrugator by standing fields, i.e., in Eq. 3 the sum over $l=1$, 3 is replaced by the sum over $l=1$, $-1$, 3 and $-3$ with $\epsilon_{-1}=-\epsilon_1$, $\epsilon_{-3}=\epsilon_3$. For this configuration $\Delta=\delta$. On the axis $$V''(0) = \frac{h^2 L(4\epsilon_1^2-6\delta\epsilon_1^2+2\delta\epsilon_1\epsilon_3+32\gamma^2\delta^2/h^2)}{8\pi B^{(\circ)2}(1-4\delta^2)^{1/2}} \quad (9)$$

By proper choice of $\epsilon_1$ and $\epsilon_3$, $V''(0)$ can be made negative for any ellipticity $q$. More general combinations of $\epsilon_1$, $\epsilon_{-1}$, $\epsilon_3$, $\epsilon_{-3}$ leading to mixtures of these embodiments are contemplated.

A major difficulty in the design of configurations with $V''(\psi)$ negative or $$\oint dl/B$$

a local maximum is in obtaining a sufficiently large volume in which $V'(\psi)$ or $$\oint dl/B$$

is decreasing. Expansion techniques enable one to examine this problem and show that the embodiments of the invention given here have an adequately large working volume.

Figure 8:
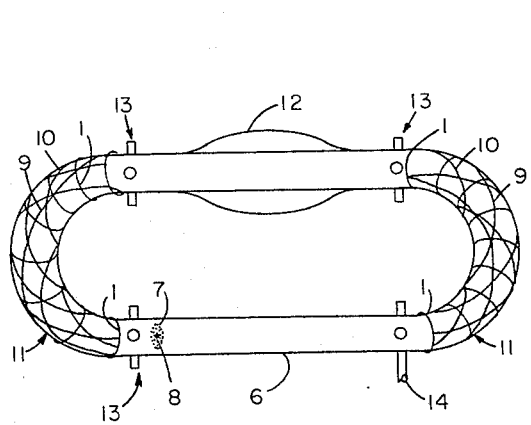
FIG. 8 is a sketch of how the Model C stellarator could be modified to utilize this invention.

A practical arrangement for utilizing the described principle embodiment of this invention is shown in FIG. 8 which shows how it is incorporated into the existing Model C stellarator at Princeton University. We utilize the parameters given in the conceptional design, Princeton University Project Matterhorn report PM–S29(NYO–7899) (1957). In FIG. 8 the existing vacuum vessel is labeled 6 as before. This vessel is an endless toroidal magnetically permeable tube forming an annulus bounded by straight and connecting end-looped tube portions in a plane. Suitable means not shown exacuate the tube to about $2\times10^{-9}$ millimeters of mercury. In this case the elliptical plasma cross section 7 has an ellipticity $q=4$, centered around a twisting magnetic axis 8 corresponding to the axis of the tube 6. Conventional axial windings 1 encircle the whole tube 6 at right angles to the axis of tube 6. Conventional multipolar, helical windings 2 corresponding to the gently twisting present multipolar windings in the Model C stellarator U-bends are arranged on both end loops to provide identical multipolar structures of the type shown in FIG. 2. Additionally, identical sharply twisting crossed multipolar helical coils 9 and 10, the coil twisting three times as fast as coil 9 and of the type shown in FIG. 2, are applied to both end loops to provide a stabilizing corrugator field system 11, corresponding to that of FIG. 2.

Referring to FIG. 8, in operation a "pumping" bulge means 12 applies ion-cyclotron heating, as is presently employed in the Model C stellarator, or magnetic pumping in one straight section. Means 13 comprise a gas injection system and viewing ports currently being used and suitable gases, such as deuterium and tritium, are injected therein and heated by the heating system 12 to form a plasma 7 having a pressure of about $2\times10^{-8}$ millimeters of mercury. Means 14 comprises a conventional divertor next to a long straight section of tube 6 with uniform axial field for carrying out experiments with a hot quiescent plasma. The configuration 11 on the two U-bends, corresponding to that shown in FIG. 2, is energized by the C stellarator motor-generator pulsing means (not shown). This configuration 11, comprising coils 1, 2, 9, and 10, produces a field of 20 to 55 kilogauss and provides conconcentric toroidal corrugated surfaces with a rotational transform. The corrugation distorts the magnetic surfaces so that the volume per unit magnetic flux enclosed between neighboring toroidal magnetic surfaces decreases outwardly and the plasma 7 is hydromagnetically stably confined away from the walls of tube 6. This configuration accomplishes stabilization by providing in and out motion of the magnetic lines on the surface to enhance the stabilizing effect of favorable curvature on certain parts of a line over unfavorable curvative on other parts of the field line. That is to say, a plot of the radius from the center of the tube to a magnetic field line along the tube axis first curves outwardly, concavely away from the center of the tube, to a sharp peak at a small distance from the center of the tube, then this line curves inwardly, convexly toward the center of the tube, to a place where this curvature is repeated in the sequence described, i.e., to provide a corrugation with periodic high points twisting around the tube axis. The $l=1$ and $l=3$ windings create a field in which the magnetic surfaces have a nearly circular cross section while retaining the desired corrugation of the magnetic field lines.

The major radius of the U-bends is 43 inches and the radius of the vacuum enclosure is 4 inches. The machine is 500 inches long. We incorporate a coil structure to provide a magnetic field given by Eq. 3 with three field periods of the corrugation field and half a field period of the shaping field in each U-bend of the stellarator: $h=0.14$ in.$^{-1}$, $\gamma=0.023$ in.$^{-1}$. A left-handed twist is incorporated into the corrugation field so that $h/\gamma$ is negative. The design and construction of this stabilizing structure is similar to that used in providing the present stabilizing windings so that each component of the field given in Eq. 3 is adjusted separately. The currents in the coils are adjusted so that $\epsilon_1=0.3$, $\epsilon_3=5.0$, and $\delta=0.2$. The currents necessary to produce these fields are significantly smaller than those used for the present multipolar windings where, for example, $0.8 < \epsilon_3 < 12.0$ in. typical operation. These parameters lead to an ellipticity of the surfaces in the U-bends, $q \sim 4.5$, a rotational transform around the machine at its axis, $\iota_M = 195°$, with shear, $B^{(0)} d\iota_M/d\psi = -7.2°$ in.$^{-2}$ on the axis. Thus a plasma column with a cross-sectional area of $2\pi$ in.$^2$ is obtained inside the vacuum enclosure.

The purpose of the stabilizing structures is to correct for positive contributions to $V''(\psi)$ from the various parts of the machine. It is found that the major destabilizing effects are from the curvature in the U-bends, $$B^{(0)2} V''_{\text{curvature}} = 0.046 \text{ in.}^{-1}$$

(Appendix C of NYO–7899), the lack of uniformity in the construction of the main confining field $$B^{(0)2} V''_{\text{ripple}} = 0.008 \text{ in.}^{-1}$$

(pages 94 through 97 of NYO–7899), and the ion cyclotron heating bulge, $B^{(0)2} V''_{\text{bulge}} = 0.016$ in.$^{-1}$ (ibid). Thus this particular design is extremely conservative.

A different embodiment of this invention utilizes a magnetic field of the form $$\underline{B} = B^{(0)} \underline{\nabla} \left\{ \alpha h r^2 \sin 2\theta + \sum_{l=0,\pm 2} \frac{\epsilon_l}{h} I_1(hr) \sin(l\theta - hz) + z \right\}$$

(10)

with $\Delta \sim \epsilon_1^2 \sim \epsilon^2 \ll 1$. (Here $\epsilon$ is again an expansion parameter which may be as large as one in the results. Here, as in the definition of symbols which entered Eq. 3, $r$, $\theta$, and $z$ are the usual cylindrical coordinates; $B^{(0)}$ is the magnitude of a uniform solenoidal magnetic field; the parameter $\alpha$ is a measure of the current flowing through a four-wire straight coil configuration (Ioffe bars) to produce an $l=2$ multipolar field with no pitch; $\epsilon_0$ measures the current through ring conductors around the vacuum vessel (mirror coils) which produce a series of bulge fields with length $2\pi/h$; and $\epsilon_2$ measures the current through an $l=2$ multipolar field with pitch $h/2$; $I_1(x)$ is the usual Bessel function of imaginary argument.) The properties of such configurations have been studied and a formalism has been developed with which even the effects of material pressure and toroidal curvature can be investigated. For small values of $hr$, the magnetic field given by Eq. 10 has a rotational transform $$\iota(0) = \frac{hL}{16} \{ (\epsilon_2^2 - \epsilon_{-2}^2)^2 - 4[16\alpha + \epsilon_0(\epsilon_2 - \epsilon_{-2})]^2 \}^{1/2}$$

(11)

and $$V''(0) =$$

$$\frac{h^2 L}{16 \pi B^{(0)2}} \frac{[(\epsilon_2^2 - \epsilon_{-2}^2)(\epsilon_2^2 = \epsilon_{-2}^2 - 2\epsilon_0^2) - 128\alpha\epsilon_0(\epsilon + \epsilon_{-2})]}{\{(\epsilon_2^2 - \epsilon_{-2}^2)^2 - 4[16\alpha + \epsilon_0(\epsilon_2 - \epsilon_{-2})]^2\}^{1/2}}$$

(12)

For purposes of illustration, setting $e_0 = -0.743\epsilon$, $\epsilon_2 = 1.068\epsilon$, $\epsilon_{-2} = 1.446\epsilon$, and $\alpha = -0.0105\epsilon^2$ yields $\iota(0) = 0.0195 hL\epsilon^2$ radians, $V''(0) = -0.0317 h^2 L\epsilon^2 / B^{(0)2}$. For these parameters $V''$ remains negative inside that magnetic surface on which the minor radius is $$hr_{\text{min}} = 0.046$$

and the major radius is $hr_{\text{max}} = 0.225$. The expansion parameter $\epsilon$ may be taken as large as one in these expressions without serious loss of accuracy due to neglect of higher order terms.

Figure 10:
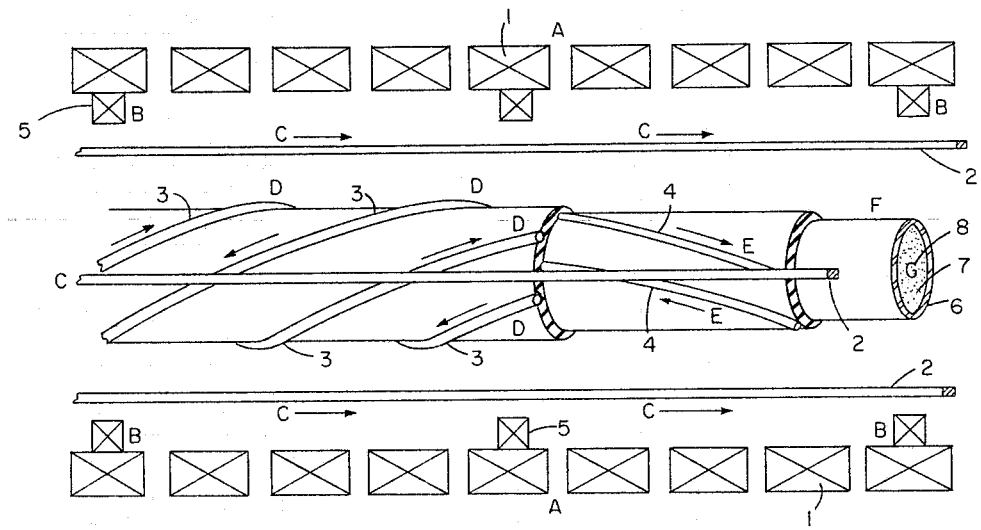
FIG. 10 is a side view of the apparatus of FIG. 9.
Figure 11:
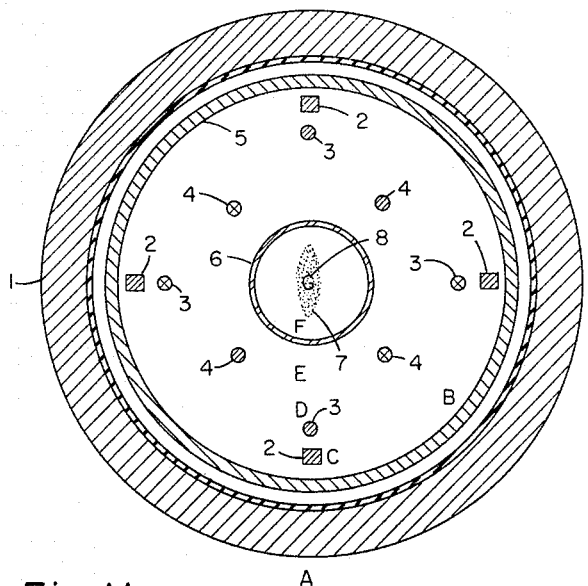
FIG. 11 is an end view of the apparatus of FIG. 9.

The characteristics of this particular configuration will be understood from Eq. 10. Each term in the equation represents the magnetic field due to current flowing in a particular coil configuration. FIGURE 9 is a partial three-dimensional view of a section of such a device and FIGS. 10 and 11 are a side view and an end view of it. The magnetic fields are produced by five distinctly different sets of coils. An ordinary solenoidal winding, coil 1 (not shown in FIG. 9), produces the uniform axial field (we neglect the effect of curvature in this discussion) associated with the first term in Eq. 10. This winding is shown in FIG. 1 of the cited Stix reference. Four longitudinal conductors 2 with current flowing in opposite directions in adjacent conductors, provide the component of the magnetic field given by the second term in this equation. A set of such coils has been installed on the Model C stellarator to correct for errors in the alignments of the magnetic fields so that the machine can be operated without the multipolar fields energized. They have been described by Sinclair, Yoshikawa, Harries, Young, Weimer, and Johnson (Phys. Fluids 8, 118 (1965) and references therein). Also Ioffe (see Baiboradov, Ioffe, Petrov, and Sobolev, J. Nucl. Energy Pt. C 5, 409 (1963)) applied this type of winding to mirror machine configurations to achieve hydromagnetic stability. The two sets of crossed conductors 3 and 4 are independent $l = \pm 2$ crossed multipolar windings with the same magnetic field periodicity along the axis of the tube so that the fields resonate. Either set is similar to the $l=2$ multipolar field conductors which are installed in one U-bend of the Model C stellarator as illustrated in FIG. 1 of the cited Stix reference. These conductors are also illustrated on pages 297 and 333 and are shown in FIG. 8.6 of the cited Glasstone reference. Currents again flow in opposite directions in adjacent conductors in each winding. The two windings twist around the machine with opposite pitches, i.e., they cross each other with one advancing along the tube in a right-handed sense and the other in the left-handed sense. Coils 5 are ordinary mirror coils (described in the cited Stix reference and shown in FIG. 1 thereof), again with the periodicity adjusted so that they resonate with the fields created by the multipolar windings. This assemblage of coils is built around an evacuated toroidal vessel 6 (shown in FIG. 1 of the cited Stix reference) and confines the plasma inside a magnetic surface which is centered on a straight magnetic axis 8, magnetic surfaces being well known. The various components of this configuration have been used individually or even with several present on the same device so that the techniques for designing, assembling, and operating such a system are well known. It should be emphasized as mentioned before that in the machine fabrication the various coils are combined so that the magnetic field given by Eq. 10 is obtained with low expenditure of power. These coil designs utilize the standard techniques which have been developed in the thermonuclear program. The plasma column configuration produced by the windings of FIG. 9 is like the plasma column configuration produced by the windings of FIG. 2. The plasma cross-section is more elliptical, however, in the configuration of FIG. 9 than in the configuration of FIG. 2. Also, the magnetic axis is straight in the configuration of FIG. 9, whereas it is twisting in the configuration of FIG. 2.

Another embodiment of the invention is obtained by replacing $\theta$ by $\theta - \gamma z$ in Eq. 10 and then adjusting the radial dependence so that Laplace's equation is satisfied. Then $$\underline{B} = B^{(0)}\underline{\nabla}\left\{z + \frac{2\delta}{\gamma}I_2(2\gamma r)\sin 2(\theta - \gamma z)\right.$$

$$\left. + \sum_{l=0,\pm 2}\frac{\epsilon_l}{h+l\gamma}I_l[(h+l\gamma)r]\sin[l(\theta-\gamma z)-hz]\right\} \quad (13)$$

Here $r$, $\theta$, and $z$ are the usual cylindrical coordinates, $B^{(0)}$ is the magnitude of a uniform solenoidal magnetic field and $\delta$, $\epsilon_0$, $\epsilon_2$ are measures of currents in coil configurations which produce multipolar fields with multiplicities $l=2$, $l=0$, and $l=2$, with periodicity lengths $2\pi/\gamma$, $2\pi/h$, and $\pi/(h+2\gamma)$ respectively; $I_1(x)$ is the usual Bessel function of imaginary argument. An understanding of a coil configuration which produces this field is obtained by visualizing FIG. 9 with the right-hand side of the figure twisted a small angle $\gamma L$ with respect to the left-hand side. With $\gamma/h \sim \epsilon_1^2 \sim \epsilon^2$ (with $\epsilon$ again a small expansion parameter which can be set equal to one) and for sufficiently small values of $hr$, this field provides magnetic surfaces, given by Eq. 4 with $$\Delta = \frac{\delta + h\epsilon_0(\epsilon_2 - \epsilon_{-2})/16\gamma}{1 - h(\epsilon^2_2 - \epsilon^2_{-2})/16\gamma} \quad (14)$$

On the axis $$\iota(0) = \gamma L - \gamma L\left[1 - \frac{h(\epsilon^2_2 - \epsilon^2_{-2})}{16\gamma}\right](1-4\Delta^2)^{1/2} \quad (15)$$

and $$V''(0) = \frac{h^2 L}{8\pi B^{(0)2}(1-4\Delta^2)^{1/2}}\left[\frac{32\gamma^2\delta\Delta}{h^2} + 3\epsilon^2_0 + \frac{1}{2}(\epsilon^2_2 + \epsilon^2_{-2})\right.$$

$$\left. + 4\Delta\epsilon_0(\epsilon_2 + \epsilon_{-2})\right] \quad (16)$$

By choosing $\delta$ sufficiently large and adjusting the $\epsilon_l$'s properly so that the sign of the last term is sufficiently negative, negative values of $V''(0)$ are obtained.

All configurations which have a straight magnetic axis have $V''(0)$ given by a quadratic expression similar in form to Eq. 16. Since all the terms in the expression except one are positive definite, it is possible to make $V''(0)$ negative only if the ratio $q \equiv r_{max}(z)/r_{min}(z)$ is somewhere larger than $2+\sqrt{3}$. This provides a serious limitation; either the vacuum enclosure is far from circular or much energy must be expended to provide a magnetic field where it is not used. The function $q$ is nearly constant in $z$ in the $l=0, \pm 2$ embodiments of the invention presented here so that the vacuum vessel with an elliptical cross section is constructed by extruding the tube.

The principal embodiment of this invention, Eq. 3, is not subject to this limitation. (This aspect of the invention, which utilizes a superposition of $l=\pm 1$, $l=\pm 3$ multipolar fields and thus does not have a straight magnetic axis, pertains not only to configurations with magnetic surfaces where $V''(\psi)$ is the meaningful stability parameter, but also to configurations with closed lines of force in which there is no straight axis.)

The slowly varying helical field associated with $\delta$ in Eqs. 3 and 13 (or the constant field associated with $\alpha$ in Eq. 10) mainly serves to determine the shape of the magnetic surfaces and thus the rotational transform. Because of this feature this term is called the "shaping" field. The terms which represent the superposition of multipolar fields with short periodicity length are called the "corrugator" field since they give the lines an inward and outward curvature. The interaction of the corrugator fields bend the lines of force so they are concave outward at that part of the magnetic surface where the radius is largest. Since the lines of force spend most of their time in this part of the surface, the distortion of the surface shown in Eq. 4 provides a heavier weighting of this region. However, the lines must bend the wrong way at other parts of the magnetic surface, giving rise to the positive terms in Eqs. 8, 9, 12, and 16.

The introduction of a more general shaping field of the of from $\Sigma_l\{2^l l!l^{-1}h^{l-2}\gamma^{1-l}\delta_l I_l(l\gamma r)\sin[l(\theta-\gamma z)+\phi_l]\}$ into Eq. 3 or 13, which corresponds to the utilization of more than four wires, all with the same long pitch but with different amounts of current in various conductors, is useful. Near the axis only the component associated with $\delta_2$ contributes to $V''$. The higher $l$ terms can be adjusted to enlarge the volume of the stable region where $V'' < 0$. They also provide magnetic field shear to help stabilize universal instabilities. A further use of these higher terms is to bring the singular surface, outside of which the lines of force all strike the wall of the enclosure, into the edge of the stable region. These configurations thus have a built-in divertor. In this regard it has recently been found that $V''$ is negative and large in the neighborhood of such a diverted surface. The negative $V''$ configurations of this invention contemplate utilization of higher $l$ fields to take advantage of these features.

In review of the above description of this invention, there is described an application of magnetic field configuration having the following properties: (1) the field is tangent to a set of nested toroidal surfaces closing in on a closed central line; (2) the field possesses a rotational transform, that is to say, the lines of force do not in general close after passing around the torus; (3) the volume pe unit magnetic flux enclosed between two infinitesimally neighborhood toroidal surfaces is decreasing outward, that is to say, away from the central ine. Fields having the properties (1) and (2) above, but not (3), comprise the conventional stellarator. The new feature contemplated by this invention is the property (3) when present in conjunction with the other properties (1) and (2). In this regard, if the condition described above under (3) is satisfied, then a sufficient amount of stability is insured independently of shear against the known instabilities; moreover the effect of nonzero resistivity in this case is a minor one, not destroying the confinement of the gas column on the time scale contemplated for the confinement of the nuclear fuel.

In connection with the above, it is noted that the property: $V'' < 0$ in some environment of the central line is not destroyed if other fields are superposed on those listed above, provided these other fields are not too large. The superposition of such additional fields (which arise in any case due to imperfections of any apparatus) may be useful in certain cases in actually extending the range over which $V'' < 0$. In other cases the effect is to increase $V''$; such fields may be necessary (e.g., the magnetic divertor), but their effect can be kept small enough to keep $V'' < 0$.

While the invention has been described by reference to a few particular embodiments it will be understood that numerous modifications may be made by those skilled in the art without actually departing from the invention. In particular several combinations of the corrugator fields and values of $l$ are described as well as more general shaping fields.

What is claimed is:

1. In a plasma confining apparatus for confining a column of ions and electrons in a toroidal system, of the type having in a plane an endless toroidal magnetically permeable tube forming an annulus bounded by straight and connecting looped tube portions, means having an axial first coil for establishing in said tube concentric toroidal magnetic field lines for producing an inward magnetic field pressure along an axis corresponding to the axis of the tube and means for providing in said tube a plasma that exerts an outward pressure against said magnetic field pressure, the improvement comprising means consisting of multipolar helical second coils for determining magnetic surfaces and providing a ripple on the magnetic surfaces for producing a volume per unit magnetic flux enclosed between neighborhood toroidal magnetic surfaces decreasing outwardly.

2. The invention of claim 1 in which said multipolar helical second coils comprise two sets of crossed helical coils that twist around said tube at different angles to produce a corrugating field with interacting helical fields that periodically corrugate the field line on which the field pressure against the plasma is a maximum.

3. The invention of claim 1 in which said second coils produce a shaping field and a corrugator field wherein $l>2$ components of a slowly twisting shaping field provide shear in said magnetic fields, and $V''(\psi)<0$ is provided by the interaction of the shaping field with the corrugator field.

4. The invention of claim 1 in which said second coils produce a magnetic field having shear and comprising a corrugator field for providing $V''(\psi)<0$.

5. The invention of claim 1 in which said second coil is to produce field shear and have an $l>2$ winding of a slowly twisting shaping field and a corrugator field of the form $V''(\psi)<0$.

6. The invention of claim 1 in which said second coils provide an $l=2$ shaping field for determining the magnetic surfaces and providing a rotational transform and an $l=0, \pm 2$ corrugator field interacting with the shaping field to make $V''(\psi)<0$.

7. The invention of claim 1 in which said second coils produce an $l=2$ shaping field for determining the magnetic surfaces and providing a rotational transform and a combination of $l=1, \pm 3$ corrugator fields interacting with the shaping field to make $V''(\psi)<0$.

8. The invention of claim 1 in which said second coils produce a corrugator field without a shaping field such that the corrugator field determines the magnetic surfaces, provides the rotational transform, and makes $V''(\psi)<0$.

9. The invention of claim 1 in which said second coils produce a shaping field and a corrugator field to make $V''(\psi)<0$.

10. The invention of claim 1 in which said second coils produce a shaping field that is an $l=3$ multiple field and a corrugator field that is a mixture of $l=0, \pm 3$ multipolar fields.

11. The invention of claim 1 in which said second coils produce a shaping field and an $l=\pm 1, \pm 3$ corrugator field with magnetic field lines that close on themselves.

12. In a plasma confining apparatus for confining a column of ions and electrons in a toroidal system, of the type having in a plane an endless toroidal magnetically permeable tube forming an annulus bounded by straight and connecting looped tube portions, means having an axial coil and a multipolar helical first coil for establishing in said tube concentric toroidal magnetic surfaces with a rotational transform for producing an inward magnetic field pressure along an axis corresponding to the axis of the tube, and means for providing in said tube a plasma that exerts an outward pressure against said magnetic field pressure, the improvement, comprising means consisting of two sets of highly twisted short period multipolar second coils having two first conductors and six second conductives twisting around said tube, the first three times faster than the second, adjacent of said conductors being energized oppositely for providing a volume per unit magnetic flux enclosed between neighborhood toroidal magnetic surfaces decreasing outwardly.

13. In the method of confining a plasma in an endless evacuated tube having an axial coil and a helical coil for producing concentric toroidal surfaces with a rotational transform, the step of providing a ripple on the magnetic surfaces for providing a volume per unit magnetic flux enclosed between neighborhood toroidal magnetic surfaces decreasing outwardly from the axis of the endless evacuated tube.

References Cited by the Examiner

UNITED STATES PATENTS

| | | | |
|---|---|---|---|
| 3,015,618 | 1/1962 | Stix | 176—3 X |
| 3,171,788 | 3/1965 | Gorman et al. | 176—1 |
| 3,219,534 | 11/1965 | Furth | 176—1 |

REUBEN EPSTEIN, *Primary Examiner.*